United States Patent [19]

Senn

[11] 4,328,409
[45] May 4, 1982

[54] CONTINUOUS, AUTOMATIC MESH WELDING STRUCTURE AND METHOD

[76] Inventor: Charles Senn, 13957 13-Mile Rd., Apt. 1, Warren, Mich. 48093

[21] Appl. No.: 92,560

[22] Filed: Nov. 8, 1979

Related U.S. Application Data

[63] Continuation-in-part of Ser. No. 828,983, Aug. 30, 1977, Pat. No. 4,174,475.

[51] Int. Cl.³ ............................................. B23K 11/10
[52] U.S. Cl. ....................................... 219/56; 219/58; 219/79; 140/112
[58] Field of Search ....................... 219/56, 58, 79, 80; 140/112

[56] References Cited

U.S. PATENT DOCUMENTS

| | | | |
|---|---|---|---|
| 2,957,070 | 10/1960 | Schachter et al. | 219/56 X |
| 4,068,110 | 1/1978 | Larsson | 219/56 |
| 4,174,475 | 11/1979 | Senn | 219/56 |

FOREIGN PATENT DOCUMENTS

| | | | |
|---|---|---|---|
| 1929788 | 3/1970 | Fed. Rep. of Germany | 140/112 |
| 2720970 | 11/1978 | Fed. Rep. of Germany | 140/112 |
| 6807656 | 12/1969 | Netherlands | 219/79 |

*Primary Examiner*—J. V. Truhe
*Assistant Examiner*—Keith E. George
*Attorney, Agent, or Firm*—Whittemore, Hulbert & Belknap

[57] ABSTRACT

Structure for and the method of supporting an initial plurality of longitudinally extending large diameter reinforcing rods in transversely aligned spaced apart relation, separately feeding individual, transversely extending reinforcing rods onto the longitudinally extending reinforcing rods at a welding position, simultaneously welding the transversely extending reinforcing rod to each of the longitudinally extending reinforcing rods at the welding position, subsequently indexing the welded transversely extending reinforcing rod and longitudinally extending reinforcing rods a predetermined distance longitudinally of the longitudinally extending reinforcing rods, repeating the feeding, welding and indexing until transversely extending reinforcing rods are welded in predetermined parallel spaced apart relation over the length of the longitudinally extending reinforcing rods, and during the repetitive feeding, welding and indexing placing additional longitudinally spaced apart large diameter reinforcing rods on the initial longitudinally extending reinforcing rods axially displaced from the welding position, and moving the additional reinforcing rods into welding position after all required transverse reinforcing rods are welded to the initial longitudinally extending reinforcing rods, and repeating the method to continuously and automatically weld airport concrete mesh sections.

8 Claims, 2 Drawing Figures

CONTINUOUS, AUTOMATIC MESH WELDING STRUCTURE AND METHOD

CROSS-REFERENCE TO RELATED APPLICATION

This application is a continuation-in-part of copending application Ser. No. 828,983, filed Aug. 30, 1977, now U.S. Pat. No. 4,174,475.

BACKGROUND OF THE INVENTION

1. Field of the Invention

The invention relates to a structure for and method of welding airport concrete steel mesh, wherein each transversely extending reinforcing rod in the steel mesh is separately welded to all the longitudinally extending spaced apart reinforcing rods simultaneously at the intersections of the transverse rod and longitudinal rods, the separate transversely extending rods are automatically fed onto the longitudinally extending reinforcing rods at a welding position, and the welded transverse and longitudinal rods are automatically indexed away from the welding position and wherein additional longitudinal rods are placed on the initial longitudinal rods as the transverse rods are welded thereto and are automatically moved into welding position when all required transverse rods are welded to the initial longitudinal rods whereby the welding of concrete steel mesh sections is continuous.

2. Description of the Prior Art

Prior automatic mesh welders have usually not been capable of welding heavy reinforcing rods such as ⅜" reinforcing rods into steel mesh such as that required for airport concrete runway reinforcement. Further, wherein steel mesh welding has been accomplished in the past, welding has been limited as to spacing between the reinforcing members due to welding gun diameter limitations, and welds have not always been satisfactory due to low welding gun pressures available. Wherein satisfactory mesh welding has been accomplished in the past, the equipment necessary therefor and the methods used have been complicated and therefore uneconomical. Often such equipment has required down time during which rods to be welded into mesh has been loaded into the equipment, so that continuous automatic welding of heavy concrete steel mesh has been impossible.

SUMMARY OF THE INVENTION

According to the present invention, a simple, economical and efficient structure for and method of continuously and automatically spot welding airport concrete steel mesh or the like is provided.

The structure includes means for supporting a plurality of large diameter, longitudinally extending steel reinforcing rods in parallel spaced apart relation, means for automatically feeding a transversely extending reinforcing rod onto a plurality of transversely spaced apart, longitudinally extending reinforcing rods at a welding position, means for simultaneously welding the transversely extending reinforcing rod to each of the longitudinally extending reinforcing rods at the intersection thereof, and means for subsequently automatically indexing the welded transversely extending reinforcing rod and longitudinally extending reinforcing rods a predetermined amount.

The structure further includes means for supporting additional large diameter steel reinforcing rods on the initial longitudinally extending reinforcing rods during welding of the transversely extending reinforcing rods to the initial longitudinally extending reinforcing rods, and means for moving the additional longitudinally extending reinforcing rods into welding position when all of the required transversely extending reinforcing rods have been welded to the initial longitudinally extending reinforcing rods after the completed reinforcing mesh thus formed is removed from the welding position, whereby automatic and continuous welding of airport concrete reinforcing mesh may be accomplished.

The method of the invention includes the steps of supporting the initial longitudinally extending reinforcing rods in parallel spaced apart relation, automatically feeding a transversely extending reinforcing rod onto the longitudinally extending reinforcing rods at a welding position, simultaneously welding the transversely extending reinforcing rod to each of the longitudinally extending reinforcing rods, automatically indexing the welded longitudinally extending and transversely extended reinforcing rods a predetermined amount, and repeating the feeding, welding and indexing steps until parallel transversely extending, longitudinally spaced apart reinforcing rods are welded to the longitudinally extending reinforcing rods over the entire length thereof.

The method of the invention further includes the steps of placing additional longitudinally extending reinforcing rods on the initial longitudinally extending reinforcing rods during the welding of transversely extending reinforcing rods thereto, and the indexing of the reinforcing mesh thus produced away from the welding position, and the step of moving the additional plurality of longitudinally extending reinforcing rods into the welding position on removal of a completed section of reinforcing mesh from the welding position whereby continuous and automatic welding of airport concrete reinforcing mesh is accomplished.

DESCRIPTION OF THE PREFERRED EMBODIMENT

Figure 1:
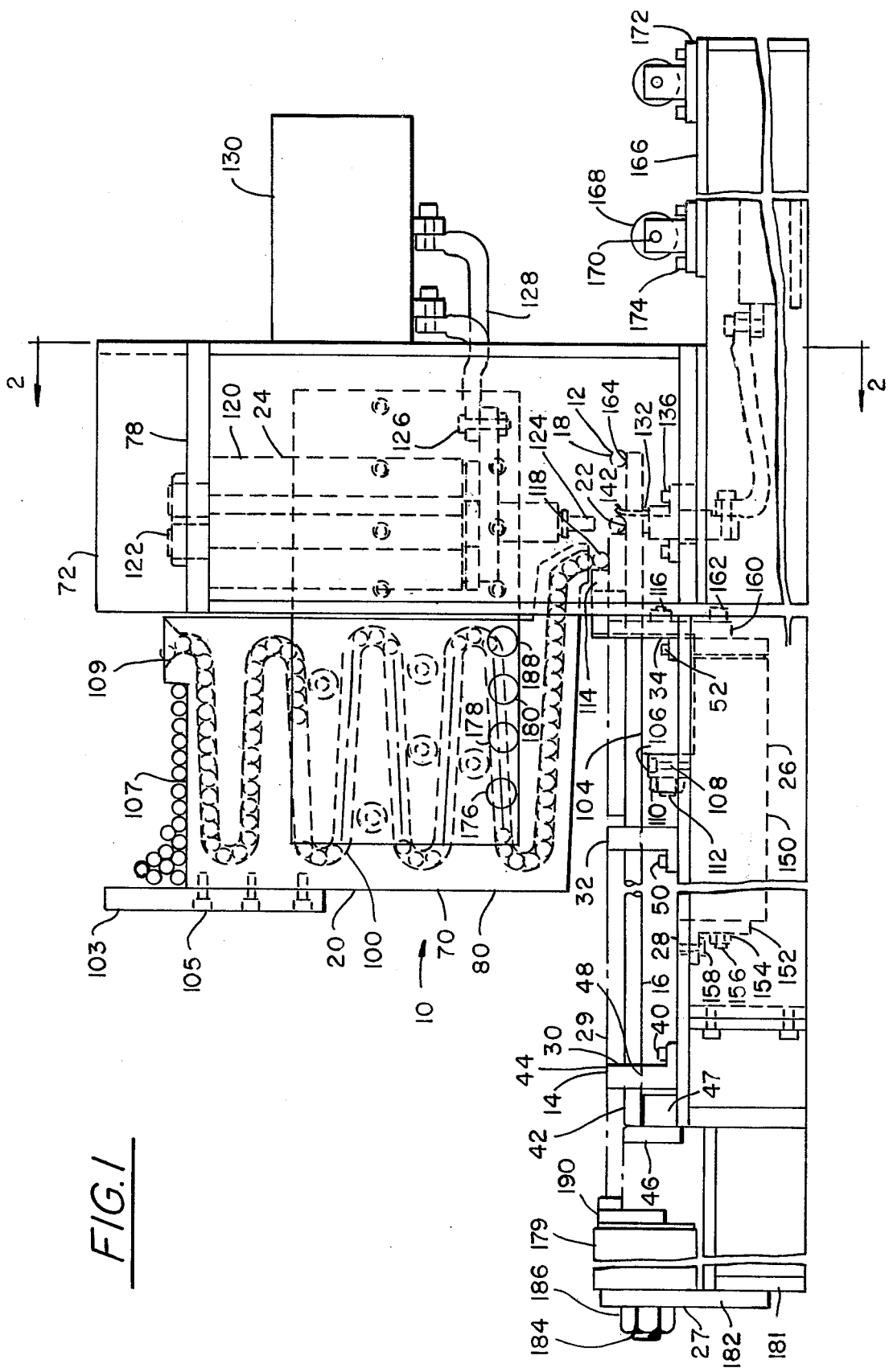
FIG. 1 is a partial elevation view of the structure for welding heavy steel mesh constructed in accordance with the invention for performing the method of the invention.
Figure 2:
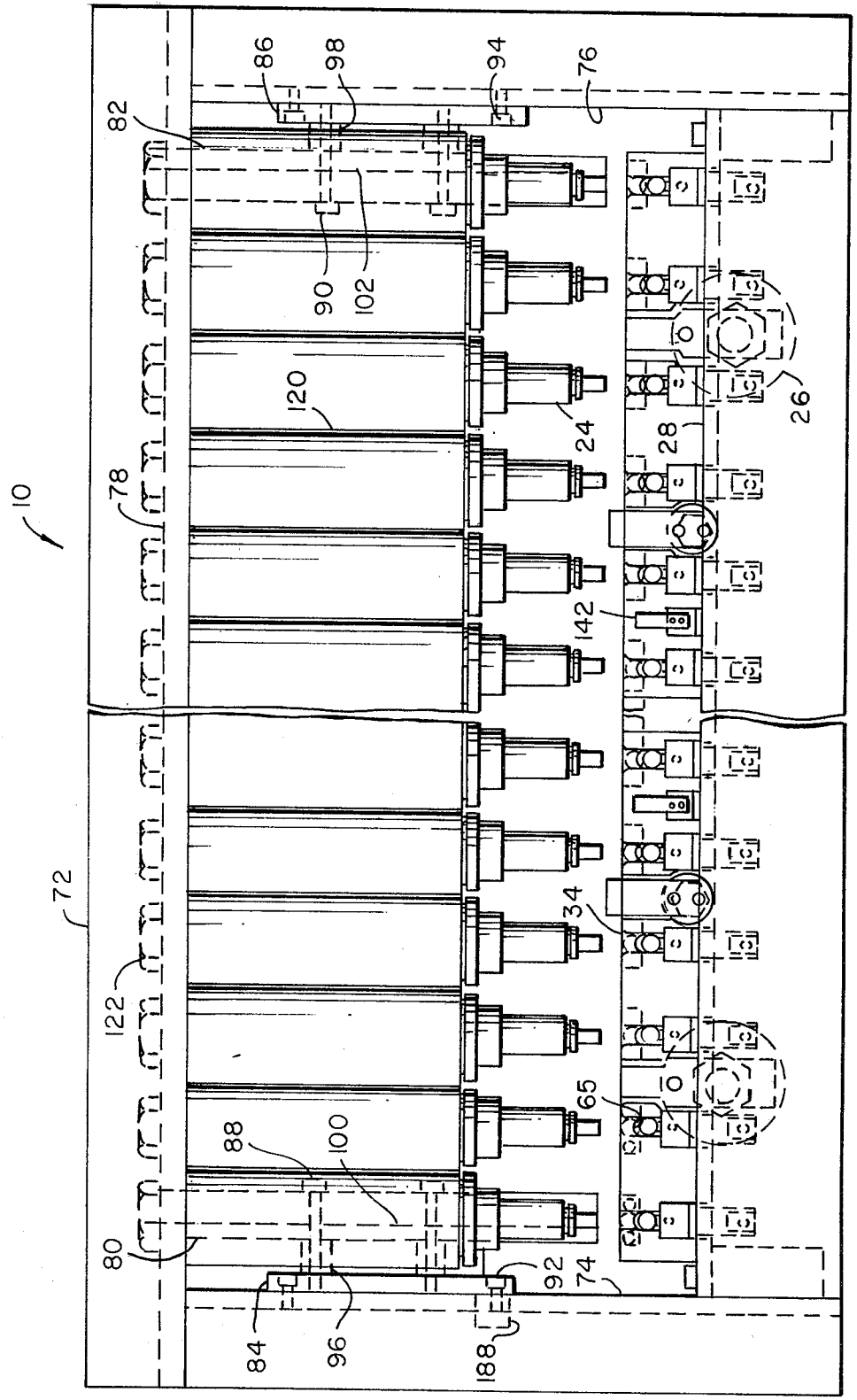
FIG. 2 is a partial section view of the structure for welding heavy steel mesh shown in FIG. 1, taken substantially on the line 2—2, FIG. 1.

As shown in FIGS. 1 and 2, the structure 10 for spot welding heavy concrete reinforcing mesh 12 includes means 14 for supporting longitudinally extending, transversely spaced apart reinforcing rods 16 and the reinforcing mesh 12 resulting from spot welding the transversely extending reinforcing rods 18 to the longitudinally extending reinforcing rods 16 in longitudinally spaced apart relation, means 20 for separately, automatically feeding the transverse reinforcing rods 18 to a welding position 22, means 24 for simultaneously spot welding each separate rod 16 and rods 18 together at their intersection with a rod 18 in the welding position, and means 26 for automatically indexing the welded transversely extending reinforcing rods 18 and longitudinally extending reinforcing rods 16 away from the welding position 22. The structure 10 further includes means 27 for moving additional longitudinally extending reinforcing rods 29 supported on reinforcing rods 16 into a welding position after the longitudinally extending reinforcing rods 16 have been welded to transversely extending reinforcing rods 18 to form a complete concrete reinforcing mesh section and the completed reinforcing mesh section has been indexed away from the welding position. The additional and subsequent sets of additional longitudinally extending reinforcing rods 29 are positioned on reinforcing rods such as reinforcing rods 16 in the welding position during welding and indexing of the reinforcing rods in the welding position, whereby the automatic welding of concrete reinforcing mesh may be continuously accomplished with no down time of the structure 10 necessary for loading of longitudinally extending reinforcing rods.

In more detail, the supporting means 14 includes a base or table 28 and supports 30, 32, and 34. The support 30, as shown best in FIG. 1, has a generally inverted L-shaped cross section and is secured to the table 28 by convenient means such as bolts 40. The support 30 extends transversely of the table 28, which as shown best in FIG. 2 is slightly wider than the width of the reinforcing mesh 12 to be welded by the structure 10. The support 30 extends across substantially the entire width of the table 28. The ends 42 of the longitudinally extending reinforcing rods 16 are positioned in deep, horizontally spaced apart notches 48 in the top 44 of the support 30 and are abutted against the locating bar 46 secured to the support 30 by convenient means such as blocks 47 and bolts, not shown. The locating bar 46 extends along substantially the entire length of the support 30.

The supports 32 and 34 illustrated in FIG. 1 are each L-shaped in cross section and are secured to the table 28 by convenient means such as bolts 50 and 52. Again, the supports 32 and 34 extend transversely across the table 28 for substantially the entire width of the table. As shown best in FIG. 2, thirty-two 13/16" transversely spaced apart notches 48 are provided in the supports 30 and 32 to receive the ¾" longitudinally extending reinforcing rods 16. The support 34 is provided with an oval opening 65 therein, as best shown in FIG. 2, through which the reinforcing rods 16 in welding position may readily pass in the longitudinal direction. The support 34 however provides a stop against which the additional and subsequent additional longitudinally extending reinforcing rods 29 may be loaded into the structure 10. On indexing of the rods 16 past the supports 34, the welding rods 29 will fall into alignment with the oval openings 65 and may be axially advanced therethrough in their turn.

In the particular mesh to be welded, there are thirty-two longitudinally extending reinforcing rods, seven of which have six 3.75" spaces between the centers thereof distributed transversely of the structure 10, and twenty-six of which have twenty-five 3.87" spaces between the centers thereof to provide a reinforcing mesh 120" wide with ¾" longitudinally extending reinforcing rods 16.

The feed means 20 includes the hopper 70 supported from the inverted U-shaped fabricated frame 72. The frame 72 includes the vertical members 74 and 76 supporting the horizontal member 78. The vertical members 74 and 76 as shown are supported at the sides of the table 28 and may be secured thereto by convenient means, not shown.

The hopper 70 includes the guide members 80 and 82 at each side thereof which are secured to plates 84 and 86 at the opposite sides of the table 28 by convenient means such as bolts 88 and 90. The plates 84 and 86 are in turn secured to the vertical members 74 and 76 of the frame 72 by convenient means such as bolts 92 and 94. Cylindrical spacers 96 and 98 extend between the plates 84 and 86 and the guide members 80 and 82 of the hopper 70 to insure rigid attachment of the guide members 80 and 82 to the plates 84 and 86 in spaced relation thereto, as shown best in FIG. 2.

Guide members 80 and 82 have channes 100 and 102 therein for receiving the ends of the transverse reinforcing rods 18 therein. The reinforcing rods 18 thus extend between the guide members 80 and 82 and proceed downwardly through a path defined by the guide channels 100 and 102 under gravitational forces.

Additional reinforcing rods 18 may be positioned on top of the guide members 80 and 82 and may be secured therein by the transversely extending plate 103 extending between the guide members 80 and 82 and secured thereto by convenient means such as bolts 105. The additional reinforcing rods 18 are supported on their ends at the upper surfaces 107 of the guide members 80 and 82 and are fed into guide channels 100 and 102 by convenient means, not shown, through the tapered openings 109.

The means 20 for feeding the reinforcing rods 18 further includes a plurality of identical piston and cylinder structures 104 positioned at spaced apart locations transversely of the tabe 28. Each of the piston and cylinder structures 104 are supported by a separate support 106 secured to the table 28 by convenient means such as bolts 108. The piston and cylinder structures 104 are secured to the support 106 by convenient means such as bolts 110 secured to studs 112 which are secured by convenient means to the cylinders of the piston and cylinder structures 104.

The piston and cylinder structures 104 further include an L-shaped transverse rod positioning member 114 secured thereto by means of bolts 116. On actuation of the piston and cylinder structure 104, the bottom transverse rod 118, as shown in FIG. 1, is moved to the right in FIG. 1 approximately one and one-half inches so that it is caused to drop into the welding position 22, as shown in FIG. 1.

The means 24 for welding the reinforcing rods 16 to a reinforcing rod 18 includes a plurality of welding guns 120 secured to the transversely extending member 78 to the frame 72 by bolts 122. The welding guns 120 may be as shown in U.S. Pat. No. 4,137,828. For closer weld spacing, the welding guns 120 have staggered center lines. The electrodes 124 secured to the welding guns 120 are therefore offset radially of the guns, as shown in U.S. Pat. Nos. 3,008,033, 3,463,895 and 3,780,253. The electrodes 124 are all brought out to a point 126 where they are connected by welding cables 128 to welding transformers 130. The welding transformers 130 are provided with electrical energy for spot welding the reinforcing rods at their intersections in position 22 simultaneously from an electrical source, not shown.

The lower electrodes 132 are provided in pairs as shown best in FIG. 2. That is, two adjacent welding guns 120 complete a complete circuit from one welding gun to one lower electrode 132 through a base connection between two adjacent lower electrodes through the second lower electrode and subsequently back to the adjacent welding gun, as described more fully in U.S. Pat. No. 3,780,253. The bottom electrodes 132 are secured to the table 28 by convenient means such as bolts 136.

The operation of the welding guns 120 and the bottom electrodes 132 is in pairs, as set forth in U.S. Pat. No. 3,780,253 referenced above. In view of the use of thirty-one spaces transverse of the mesh to be welded and the consequent thirty-two guns required, no false guns or electrodes are needed in the structure 10.

Leaf springs 142 are supported in spaced apart transverse relation along the row of lower electrodes 132 to hold the transversely extending reinforcing rods 18 in the welding position 22.

The means 26 for indexing the longitudinally extending reinforcing rods 16 and the transversely extending reinforcing rods 18 welded thereto includes the larger piston and cylinder structures 150 secured to the L-shaped brackets 152 by convenient means such as a bolt 154 and stud 156. The brackets 152 are secured to the table 128 by further bolts 158. An L-shaped mesh engaging member 160 is secured to each piston and cylinder structure 150 by convenient means such as a bolt 162.

When the piston and cylinder structure 150 is actuated, the transversely extending reinforcing rod 18 at the welding position 22, which has just been welded to the longitudinally extending reinforcing rods 16, is indexed approximately three inches to the position 164 along with the longitudinally extending reinforcing rods 16 and the other transversely extending reinforcing rods which have been welded to the longitudinally extending reinforcing rods 16 in previous cycles of the structure 10.

On return of the piston and cylinder structures 150 to the position shown in FIG. 1, the structure 10 is ready to receive a further transversely extending reinforcing rod 18 in the welding position 22.

A table 166 is provided adjacent the table 28 and includes rollers 168 thereon for receiving the welded mesh. The rollers 168 are mounted in bearings 170 secured in inverted T-shaped cross section supports 172 which are bolted to the table 166 by bolts 174. Indexing of the welded mesh is facilitated by the rollers 168.

The structure 27 for moving the second plurality of longitudinally extending reinforcing rods 29 into the welding position includes triple action piston and cylinder structures 179 such as disclosed in U.S. Pat. No. 4,137,828. The triple acting piston and cylinder structures 179, such as three for example, are spaced apart transversely over the width of the table 28 and are supported from an extension 181 of the table 28 by the plate 182 to which they are secured by means of a stud 184 secured to the piston and cylinder structures 179 and extending through the plate 182 and the nut 186.

In operation, the additional longitudinally extending reinforcing rods 29 are positioned on the reinforcing rods 16, as shown in phantom in FIG. 1, in abutment with the support 34 above the oval openings 65 therein. The rods 29 are guided through the notches in the brackets 30 and 32. The rods 29 are loaded onto the rods 16 while the rods 16 are being welded into completed mesh and indexed through the welding position. On the rods 16 passing the bracket 34, the front end of the rods 29 align with the oval openings 65 in the guides 34 and the rods 29 are moved forward into the welding position by actuation of the piston and cylinder structures 178 moving the rods 29 forward sufficiently to pass the bar 46.

The welding of the longitudinally extending reinforcing rods 16 and 29 to the transversely extending reinforcing rods 18 may thus be accomplished automatically and continuously without down time for the structure 10 while additional longitudinally extending reinforcing rods are loaded into the structure 10.

In overall operation of the structure 10 for automatically welding airport concrete steel reinforcing mesh with the piston and cylinder structures 104 and 150 initially in the condition shown in FIG. 1, a plurality of parallel spaced apart, longitudinally extending reinforcing rods 16 are placed on the supporting means 14 with their ends 42 against the stop 46. A plurality of transversely extending reinforcing rods 18 are placed in the hopper 70, with their ends in the guide channels 100 and 102 so that the bottom transversely extendng reinforcing rod 18 is in the position of the rod 118 in FIG. 1 to which all transversely extending reinforcing rods 18 are sequentially fed by gravity.

The piston and cylinder structure 104 is then actuated to move to the right, FIG. 1, by convenient means such as the automatically operated valve 176 shown secured to the hopper 70 for convenience in FIG. 1. The piston and cylinder structure 104 thus moves the bottom reinforcing rod 18 from the position shown at 118 to the welding position 22 shown in FIG. 1.

With a transversely extending reinforcing rod 18 in the welding position, the piston and cylinder structure 104 is returned to the position shown in FIG. 1 and a subsequent transversely extending reinforcing rod positions itself by gravity in the position 118.

By means of the second valve 178, the welding guns 120 are actuated to apply welding pressure between the upper electrodes 124 and the lower electrodes 132, at which time a spot welding current is passed therebetween to cause simultaneous welds along the length of the transversely extending reinforcing rod 18 at each intersection with a longitudinally extending reinforcing rod 16. When the welds are complete, the welding guns are withdrawn, again by means of automatic operation of the valve 178.

On withdrawal of the welding guns 120, the large piston and cylinder structures 150 are actuated by valve 180 to index the transversely extending reinforcing rod which has just been welded to the longitudinally extending reinforcing rods 16 into the position 164, after which the piston and cylinder structure 150 is returned to the position illustrated in FIG. 1.

The above indicated cycle is repeated until a complete reinforcing mesh section has been welded, at which time the welded reinforcing mesh section is removed from the rollers 168.

While the longitudinally extending reinforcing rods 16 are being indexed through the welding position, the additional longitudinally extending reinforcing rods 29 are positioned thereon against the guide 34, the longitudinally extending rods 29 are moved into the welding position through the oval openings in the guides 34 by the piston and cylinder structures 179 and the plate 190 thereon by actuation of valve 188 after the longitudinally extending reinforcing rods 16 have moved past the welding position. The cycle may then start over. Thus, the automatic welding of heavy airport concrete reinforcing mesh is accomplished continuously without machine down time.

The valves 176, 178, 180 and 188 which are preferably pneumatic may be automatically actuated by convenient pneumatic signals in accordance with available valve designs. It is not intended to claim novelty for specific valves herein. The piston and cylinder structures are also preferably pneumatically operated.

While one embodiment of the present invention has been considered in detail, it will be understood that other embodiments and modifications thereof are contemplated. It is the intention to include all such embodiments and modifications within the scope of the invention as are defined by the appended claims.

I claim:

1. Structure for continuously, automatically welding heavy steel mesh comprising means for supporting initial longitudinally extending reinforcing rods in transversely spaced apart parallel positions, means operably associated with the longitudinally extending reinforcing rods for automatically feeding transversely extending reinforcing rods onto the longitudinally extending reinforcing rods one at a time at a predetermined welding position comprising a mesh engaging member having a guiding surface extending parallel to the longitudinally extending reinforcing rods and positioned above the longitudinally extending reinforcing rods approximately the diameter of the transversely extending reinforcing rods and terminating in an abutment surface adjacent the welding position, a positioning member extending above the guiding surface on the mesh engaging member, piston and cylinder structure mounting said positioning member for reciprocal movement toward and away from the welding position whereby a transversely extending reinforcing rod positioned on the guiding surface of the mesh engaging member may be moved into the welding position adjacent the abutment surface of the mesh engaging member on movement of the positioning member toward the welding position, and a second transversely extending reinforcing rod is allowed to move onto the guiding surface of the mesh engaging member on movement of the positioning member away from the welding position, and means for positioning tranversely extending reinforcing rods onto the guiding surface of the mesh engaging member one at a time, means at the welding position operably associated with the supporting and feeding means for simultaneously welding a transversely extending reinforcing rod to the longitudinally extending reinforcing rods at the intersections of the longitudinally extending reinforcing rods and the transversely extending reinforcing rod, means operably associated with the welded transversely extending and longitudinally extending reinforcing rods for automatically indexing the welded reinforcing rods to position the longitudinally extending reinforcing rods for receipt of a subsequent transversely extending reinforcing rod at the welding position in parallel spaced apart relation to the welded transversely extending reinforcing rod, including the mesh engaging member and piston and cylinder means secured thereto for moving the mesh engaging member reciprocally in the direction of extent of the longitudinally extending reinforcing rods a distance equal to the desired spacing between the transversely extending reinforcing rods, means for supporting additional longitudinally extending reinforcing rods on the initial longitudinally extending reinforcing rods over a substantial portion of the length thereof, and means for moving the additional longitudinally extending reinforcing rods into the welding position after the initial longitudinally extending reinforcing rods have been indexed out of the welding position.

2. Structure as set forth in claim 1 wherein the means for supporting additional longitudinally extending reinforcing rods on the initial longitudinally extending reinforcing rods comprises guide means positioned beneath and spaced apart longitudinally of the initial longitudinally extending reinforcing rods having notches therein for receiving the initial longitudinally extending reinforcing rods and the additional longitudinally extending reinforcing rods positioned on top of the initial longitudinally extending reinforcing rods, and further guide means positioned adjacent the welding position having an oval opening therethrough for allowing passage of the lower initial longitudinally extending reinforcing rods axially therethrough and which will initially prevent the upper additional longitudinally extending reinforcing rods from axial movement into the welding position.

3. Structure as set forth in claim 1 wherein the means for moving the additional longitudinally extending reinforcing rods into the welding position after the initial longitudinally extending reinforcing rods have been indexed out of the welding position comprises a plurality of additional piston and cylinder structures positioned adjacent the one end of the additional longitudinally extending reinforcing rods opposite the welding position and means secured to the additional piston and cylinder structures engageable with the one ends of the additional longitudinally extending reinforcing rods for selectively axially moving the additional longitudinally extending reinforcing rods into the welding position on actuation of the additional piston and cylinder structures.

4. The method of continuously automatically welding heavy steel mesh comprising supporting initial longitudinally extending reinforcing rods in transversely spaced apart parallel positions, automatically feeding transversely extending reinforcing rods onto the longitudinally extending reinforcing rods one at a time at a predetermined welding position, welding a transversely extending reinforcing rod to the longitudinally extending reinforcing rods at the intersections of the longitudinally extending reinforcing rods and the transversely extending reinforcing rod simultaneously, indexing the welded reinforcing rods to position the longitudinally extending reinforcing rods for receipt of a subsequent transversely extending reinforcing rod at the welding position in parallel spaced apart relation to the welded transversely extending reinforcing rod a distance equal to the desired spacing of transversely extending reinforcing rods on the longitudinally extending reinforcing rods, repeating the feeding, welding and indexing steps until a complete mesh section is produced, supporting additional longitudinally extending reinforcing rods on the initial longitudinally extending reinforcing rods over a substantial portion of the length thereof during repetitive welding and indexing steps, and moving the additional longitudinally extending reinforcing rods axially into the welding position after the initial longitudinally extending reinforcing rods have been indexed out of the welding position.

5. Structure for continuously and automatically welding steel mesh comprising means for positioning an initial plurality of parallel, longitudinally extending and transversely spaced apart reinforcing rods with one end at a welding position, means for feeding a transversely extending reinforcing rod onto the initial longitudinally extending reinforcing rods at the welding position, means for simultaneously welding the longitudinally extending reinforcing rods and the transversely extending reinforcing rod to each other at the intersections thereof at the welding position, means for indexing the welded longitudinally extending and transversely extending reinforcing rods away from the welding position a distance substantially equal to desired spacing of transversely extending reinforcing rods on the longitudinally extending reinforcing rods whereby transversely extending reinforcing rods may be repeatedly automatically welded to the longitudinally extending reinforcing rods to provide a complete reinforcing mesh section, structure for supporting additional longitudinally extending reinforcing rods on the initial longitudinally extending reinforcing rods over a substantial portion of the length thereof, and means for moving the additional longitudinally extending reinforcing rods into the welding position after the initial longitudinally extending reinforcing rods have been indexed out of the welding position.

6. Structure as set forth in claim 5 wherein the means for supporting additional longitudinally extending reinforcing rods on the initial longitudinally extending reinforcing rods comprises guide means positioned beneath and spaced apart longitudinally of the initial longitudinally extending reinforcing rods having notches therein for receiving the initial longitudinally extending reinforcing rods and the additional longitudinally extending reinforcing rods positioned on top of the initial longitudinally extending reinforcing rods, and further including guide means positioned adjacent the welding position having an oval opening therethrough for allowing passage of the lower initial longitudinally extending reinforcing rods axially therethrough and which will initially prevent the upper additional longitudinally extending reinforcing rods from axial movement into the welding position.

7. Structure as set forth in claim 5 wherein the means for moving the additional longitudinally extending reinforcing rods into the welding position after the initial longitudinally extending reinforcing rods have been indexed out of the welding position comprises a plurality of additional piston and cylinder structures positioned adjacent the one end of the additional longitudinally extending reinforcing rods opposite the welding position and means secured to the additional piston and cylinder structures engageable with the one ends of the additional longitudinally extending reinforcing rods for selectively axially moving the additional longitudinally extending reinforcing rods into the welding position on actuation of the additional piston and cylinder structures.

8. The method of continuously and automatically welding steel mesh comprising positioning an initial plurality of longitudinally extending and transversely spaced apart reinforcing rods with one end at a welding position, feeding a transversely extending reinforcing rod onto the initial longitudinally extending reinforcing rods at the welding position, simultaneously welding the longitudinally extending reinforcing rod to each other at the intersections thereof at the welding position, indexing the welded longitudinally extending and transversely extending reinforcing rods away from the welding position a distance substantially equal to a desired spacing of transversely extending reinforcing rods on the longitudinally extending reinforcing rods and repeatedly automatically welding transversely extending reinforcing rods to the indexed longitudinally extending reinforcing rods to provide a complete reinforcing mesh section, supporting additional longitudinally extending reinforcing rods on the initial longitudinally extending reinforcing rods over a substantial portion of the length thereof, and moving the additional longitudinally extending reinforcing rods into the welding position after the initial longitudinally extending reinforcing rods have been indexed out of the welding position.

* * * * *